United States Patent [19]

Pedrazzetti et al.

[11] Patent Number: 4,708,979
[45] Date of Patent: Nov. 24, 1987

[54] PROCESS FOR THE STABILIZATION OF SPHERICALLY POLYMERIZED POLYOLEFINS

[75] Inventors: Enea Pedrazzetti, Reinach, Switzerland; André Schmitter, Hegenheim, France; Walter W. Meyer, Basel, Switzerland

[73] Assignee: Ciba-Geigy Corporation, Ardsley, N.Y.

[21] Appl. No.: 856,083

[22] Filed: Apr. 25, 1986

[30] Foreign Application Priority Data

May 2, 1985 [CH] Switzerland .......................... 1869/85

[51] Int. Cl.$^4$ .......................... C08K 5/17; C08K 5/32; C08K 5/34
[52] U.S. Cl. .................................. 524/249; 523/223; 524/96; 524/99; 524/100; 524/161; 524/243; 524/244; 524/245; 524/236; 524/251; 524/291
[58] Field of Search ............... 523/207, 220, 333, 223; 524/243, 247, 249, 251, 99, 96, 100, 161, 375, 244, 245; 526/909

[56] References Cited

U.S. PATENT DOCUMENTS

| | | | |
|---|---|---|---|
| 2,717,680 | 9/1955 | Sullivan | 252/404 |
| 3,288,748 | 11/1966 | Cyba | 524/249 |
| 3,349,059 | 10/1967 | Lappin | 524/249 |
| 3,408,320 | 10/1968 | Brucksch | 524/375 |
| 3,476,698 | 11/1969 | Osterrieth et al. | 524/166 |
| 3,478,096 | 11/1969 | Cyba | 524/243 |
| 3,654,220 | 4/1972 | Cyba | 524/243 |
| 3,668,179 | 6/1972 | Di Biasi | 524/161 |
| 3,746,681 | 7/1973 | McClain | 524/585 |
| 3,962,123 | 6/1976 | DiBattista et al. | |
| 4,315,874 | 2/1982 | Ushida et al. | 526/909 |
| 4,341,677 | 7/1982 | Tamosauskas | 524/375 |
| 4,454,270 | 6/1984 | Kolodchin et al. | 524/249 |
| 4,511,703 | 4/1985 | Bailly | 526/909 |

FOREIGN PATENT DOCUMENTS

| | | |
|---|---|---|
| 620180 | 7/1961 | Belgium . |
| 59-150719 | 8/1984 | Japan . |
| 60-63274 | 4/1985 | Japan . |
| 566138 | 12/1944 | United Kingdom . |

OTHER PUBLICATIONS

P. Galli et al., Angew. Makromol. Chem., 120, 73 (1984).

Primary Examiner—Veronica P. Hoke
Attorney, Agent, or Firm—Luther A. Hall

[57] ABSTRACT

Spherically polymerized polyolefins can be advantageously stabilized by being treated with at least one emulsion or dispersion containing a stabilizer or a mixture of stabilizers and an amine of formula I

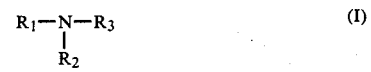

wherein $R_1$ is $C_1$-$C_{20}$alkyl which may be substituted by —OH, or is $C_3$-$C_{50}$alkyl which is interrupted by one or more oxygen atoms, or is $C_1$-$C_8$alkoxy, and each of $R_2$ and $R_3$ independently of the other is hydrogen or has one of the meanings indicated for $R_1$, or $R_2$ and $R_3$, together with the nitrogen atom to which they are attached, form a 5- to 7-membered heterocyclic ring.

10 Claims, No Drawings

PROCESS FOR THE STABILIZATION OF SPHERICALLY POLYMERIZED POLYOLEFINS

The present invention relates to a process for the stabilisation of spherically polymerised polyolefins by treating said polyolefins with an emulsion or dispersion of a stabiliser or of a mixture of stabilisers, as well as to the polyolefins stabilised in this manner.

No satisfactory method of stabilisation is known for the recently developed spherically polymerised polyolefins as described e.g. by P. Galli, P. C. Barbé and L. Noristi in "High Yield Catalysts in Olefin Polymerization", Die Angewandte Makromolekulare Chemie (Applied Macromolecular Chemistry) 120 (1984), pp. 73-90 (No. 1935). The customary methods of stabilising polyolefins in powdered form, e.g. by incorporation of the stabiliser in powdered form and subsequent extrusion, can not be applied since they do not allow a sufficiently homogeneous distribution. A process for the stabilisation of spherically polymerised polypropylene is described in Japanese Kokai Sho 59-150719. In said process, the spherically polymerised polypropylene is treated in a high-speed mixer at temperatures up to a maximum of 162° C. with a stabiliser or mixture of stabilisers, the melting point of which is lower than 162° C. The spherical polymer particles are thereby coated with the stabiliser melt. Also when applying this method problems of distribution arise, for the results are not entirely satisfactory. The addition of, preferably, 3 to 15% by weight of a binder, based on the polypropylene, can improve the results somewhat.

Surprisingly, it has now been found that the above-mentioned spherically polymerised polyolefins can be stabilised in very satisfactory manner even without the addition of a binder, if they are treated with an emulsion or dispersion of a stabiliser or of a mixture of stabilisers, which emulsion or dispersion contains a small amount of an amine.

Stable aqueous dispersions containing a phenolic antioxidant, a soap and a non-ionic or anionic surface-active compound are described in U.S. Pat. No. 3 962 123. Said dispersions are suitable for example for the stabilisation of acrylonitrile/butadiene/styrene or acrylonitrile/methyl acrylate.

Aqueous dispersions of phenolic antioxidants are also described in Japanese Kokai Sho No. 60-63274.

The present invention relates to a process for the stabilisation of spherically polymerised polyolefins by treating said polyolefins with at least one emulsion or dispersion containing a stabiliser or a mixture of stabilisers and 0.05 to 1% by weight, based on the polyolefin, of an amine of formula I $$R_1-N-R_3 \atop R_2 \qquad (I)$$

wherein $R^1$ is $C_1-C_{20}$alkyl which may be substituted by —OH, or is $C_3-C_{50}$alkyl which is interrupted by one or more oxygen atoms, or is $C_1-C_8$alkoxy, and each of $R_2$ and $R_3$ independently of the other is hydrogen or has one of the meanings indicated for $R_1$, or $R_2$ and $R_3$, together with the nitrogen atom to which they are attached, form a 5- to 7-membered heterocyclic ring.

$R_1$, $R_2$ and $R_3$ as $C_1-C_{20}$alkyl are for example methyl, ethyl, propyl, isopropyl, butyl, tert-butyl, n-pentyl, α-methylpentyl, hexyl, 2,4-dimethylpentyl, n-octyl, 6-methylheptyl, 2-ethylhexyl, decyl, dodecyl, octadecyl, octadecylethyl or eicosyl. Linear alkyl is preferred, with linear $C_{12}-C_{18}$alkyl being most preferred.

$R_1$, $R_2$ and $R_3$ as alkyl which is substituted by —OH are preferably $C_1-C_8$alkyl which is substituted terminally by —OH, e.g. hydroxymethyl, 2-hydroxyethyl, 3-hydroxypropyl, 1-hydroxyisopropyl, 6-hydroxyhexyl or 8-hydroxyoctyl, with 1-hydroxyisopropyl being preferred and 2-hydroxyethyl being most preferred.

$R_1$, $R_2$ and $R_3$ as alkyl which is interrupted by oxygen are preferably alkyl which is interrupted by more than one oxygen atom, e.g. by 2 to 20 oxygen atoms. Particularly preferred are radicals of the formula

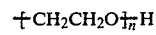

wherein n is an integer from 2 to 20.

If $R_2$ and $R_3$, together with the nitrogen atom to which they are attached, form a heterocyclic ring, then said ring is e.g. pyrazolidin-1-yl, piperidino, morpholino, piperazin-1-yl, 4-methylpiperazin-1-yl, hexahydroazepin-1-yl, homopiperazin-1-yl or 4-methyl-homopiperazin-1-yl.

$R_1$, $R_2$ and $R_3$ as alkoxy are e.g. methoxy, ethoxy, 3-propoxy, 4-n-butoxy or 1-n-octyloxy.

Liquid amines of formula I are preferred. Liquid amines of formula I wherein at least one of the radicals $R_2$ and $R_3$ has one of the meanings indicated above for $R_1$ are particularly preferred. Amines wherein $R_1$ is straight chain $C_{12}-C_{18}$alkyl and at least one of the radicals $R_2$ and $R_3$ is a group

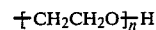

wherein n is an integer from 1 to 10, are likewise preferred.

The liquid amines of formula I wherein $R_1$, $R_2$ and $R_3$ are $C_2-C_4$alkyl which is substituted terminally by —OH, e.g. triethanolamine, are also particularly preferred.

Examples of suitable amines are butylamine, dibutylamine, triethanolamine, triisopropanolamine, N,N-bis(diethanol)dodecylamine, N,N-bis(diethanol)octadecylamine, 2,4,6-trimethylpyridine, 2,3,6-trimethylpyridine and mixtures thereof and technical amine mixtures for example that which is commercially available under the name of Atmer 163 ® (manufactured by ATLAS) or that which is commercially available under the name of Armostat A 400 ® (manufactured by AKZO).

The emulsion or dispersion which the polyolefin is treated with contains the stabiliser or mixture of stabilisers preferably in an amount of 0.03 to 5% by weight, most preferably 0.1 to 1.0% by weight, based on the polyolefin.

Examples of suitable stabilisers are the following:
1. Antioxidants
   1.1. Alkylated monophenols
      2,6-di-tert-butyl-4-methylphenol
      2-tert-butyl-4,6-dimethylphenol
      2,6-di-tert-butyl-4-ethylphenol
      2,6-di-tert-butyl-4-n-butylphenol
      2,6-di-tert-butyl-4-isobutylphenol
      2,6-dicyclopentyl-4-methylphenol
      2-(α-methylcyclohexyl)-4,6-dimethylphenol
      2,6-dioctadecyl-4-methylphenol
      2,4,6-tricyclohexylphenol
      2,6-di-tert-butyl-4-methoxymethylphenol 1.2. Alkylated hydroquinones
   2,6-di-tert-butyl-4-methoxyphenol
   2,5-di-tert-butylhydroquinone
   2,5-di-tert-amylhydroquinone
   2,6-diphenyl-4-octadecyloxyphenol
1.3. Hydroxylated thiodiphenyl ethers
   2,2'-thiobis(6-tert-butyl-4-methylphenol)
   2,2'-thiobis(4-octylphenol)
   4,4'-thiobis(6-tert-butyl-3-methylphenol)
   4,4'-thiobis(6-tert-butyl-2-methylphenol)
1.4. Alkyldienebisphenols
   2,2'-methylenebis(6-tert-butyl-4-methylphenol)
   2,2'-methylenebis(6-tert-butyl-4-ethylphenol)
   2,2'-methylenebis[4-methyl-6-(α-methylcyclohexyl)phenol]
   2,2'-methylenebis(4-methyl-6-cyclohexylphenol)
   2,2'-methylenebis(6-nonyl-4-methylphenol)
   2,2'-methylenebis(4,6-di-tert-butylphenol)
   2,2'-ethylidenebis(4,6-di-tert-butylphenol)
   2,2'-ethylidenebis(6-tert-butyl-4-isobutylphenol)
   2,2'-methylenebis[6-(α-methylbenzyl)-4-nonylphenol]
   2,2'-methylenebis[6-(α,α-dimethylbenzyl)-4-nonylphenol]
   4,4'-methylenebis(2,6-di-tert-butylphenol)
   4,4'-methylenebis(6-tert-butyl-2-methylphenol)
   1,1-bis(5-tert-butyl-4-hydroxy-2-methylphenyl)butane
   2,6-bis(3-tert-butyl-5-methyl-2-hydroxybenzyl)-4-methylphenol
   1,1,3-tris(5-tert-butyl-4-hydroxy-2-methylphenyl)butane
   1,1-bis(5-tert-butyl-4-hydroxy-2-methylphenyl)-3-n-dodecylmercaptobutane
   ethylene glycol bis[3,3-bis(3'-tert-butyl-4'-hydroxyphenyl)butyrate]
   bis(3-tert-butyl-4-hydroxy-5-methylphenyl)dicyclopentadiene
   bis[2-(3'-tert-butyl-2'-hydroxy-5'-methylbenzyl)-6-tert-butyl-4-methylphenyl]terephthalate
1.5. Benzyl compounds
   1,3,5-tris(3,5-di-tert-butyl-4-hydroxybenzyl)-2,4,6-trimethylbenzene
   bis(3,5-di-tert-butyl-4-hydroxybenzyl)sulfide
   isooctyl 3,5-di-tert-butyl-4-hydroxybenzylmercaptoacetate
   bis(4-tert-butyl-3-hydroxy-2,6-dimethylbenzyl)dithiolterephthalate
   1,3,5-tris(3,5-di-tert-butyl-4-hydroxybenzyl)isocyanurate
   1,3,5-tris(4-tert-butyl-3-hydroxy-2,6-dimethylbenzyl)isocyanurate
   dioctadecyl 3,5-di-tert-butyl-4-hydroxybenzylphosphonate
   calcium salt of monoethyl 3,5-di-tert-butyl-4-hydroxybenzylphosphonate
1.6. Acylaminophenols
   anilide of 4-hydroxylauric acid
   anilide of 4-hydroxystearic acid
   2,4-bis(octylmercapto)-6-(3,5-di-tert-butyl-4-hydroxyanilino)-s-triazine
   octyl N-(3,5-di-tert-butyl-4-hydroxyphenyl)carbamate
1.7. Esters of β-(3,5-di-tert-butyl-4-hydroxyphenyl)propionic acid with mono- or polyhydric alcohols, e.g. with

| | |
|---|---|
| methanol | diethylene glycol |
| octadecanol | triethylene glycol |
| 1,6-hexanediol | pentaerythritol |
| neopentyl glycol | tris(hydroxyethyl) isocyanurate |
| thiodiethylene glycol | N,N'-bis(hydroxyethyl)oxalic acid diamide |

1.8. Esters of β-(5-tert-butyl-4-hydroxy-b 3-methylphenyl)propionic acid with mono- or polyhydric alcohols, e.g. with

| | |
|---|---|
| methanol | diethylene glycol |
| octadecanol | triethylene glycol |
| 1,6-hexanediol | pentaerythritol |
| neopentyl glycol | tris(hydroxyethyl) isocyanurate |
| thiodiethylene glycol | N,N'-bis(hydroxyethyl)oxalic acid diamide |

1.9. Amides of β-(3,5-di-tert-butyl-4-hydroxyphenyl)propionic acid e.g.
   N,N'-bis(3,5-di-tert-butyl-4-hydroxyphenylpropionyl)hexamethylenediamine
   N,N'-bis(3,5-di-tert-butyl-4-hydroxyphenylpropionyl)trimethylenediamine
   N,N'-bis(3,5-di-tert-butyl-4-hydroxyphenylpropionyl)hydrazine.
2. UV absorbers and light stabilisers
   2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5'-di-tert-amyl and 3',5'-bis(α,α-dimethylbenzyl) derivatives.
   2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.
   2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate and hexadecyl 3,5-di-tert-butyl-4-hydroxybenzoate.
   2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxycinnamate, methyl α-carbomethoxy-p-methoxycinnamate and N-(β-carbomethoxy-β-cyanovinyl)-2-methylindoline.
   2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzylphosphonic acid monoalkyl esters, e.g. of the methyl or ethyl ester, nickel complexes of ketoximes, e.g. of 2-hydroxy-4-methylphenyl undecyl ketoneoxime, nickel complexes of 1-phenyl-4-lauroyl-5-hydroxypyrazole, with or without additional ligands.
   2.6. Sterically hindered amines, for example bis(2,2,6,6-tetramethylpiperidyl)sebacate, bis(1,2,2,6,6-pentamethylpiperidyl)sebacate, bis(1,2,2,6,6-pentamethylpiperidyl) n-butyl-3,5-ditert-butyl-4-hydroxybenzylmalonate, the condensation product of 1-hydroxyethyl-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butane tetracarboxylate, 1,1'-(1,2-ethanediyl)bis(3,3,5,5-tetramethylpiperazinone).

2.7. Oxalic acid diamides, for example 4,4'-dioctyloxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5tert-butyl-2'-ethyloxanilide and its mixture with 2-ethoxy-2'-ethyl-5,4'-di-tert-butyloxanilide and mixtures of ortho- and para-methoxy-disubstituted oxanilides and mixtures of o- and p-ethoxy-disubstituted oxanilides.

3. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic acid dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, tristearyl sorbitol triphosphite, tetrakis(2,4-di-tert-butylphenyl) 4,4'-biphenylene diphosphonite, 3,9-bis(2,4-di-tert-butyl phenoxy)-2,4,8,10-tetraoxa-3,9-diphosphaspiro[5.5]undecane.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example calcium stearate, zinc stearate, magnesium stearate, sodium ricinoleate and potassium palmitate, antimony pyrocatecholate or tin pyrocatecholate.

Particularly suitable stabilisers are antioxidants. Preferred antioxidants are those from the group of hindered phenols, in particular esters of β-(3,5-di-tert-butyl-4-hydroxyphenyl)propionic acid, some of which esters are listed under section 1.7.

Mixtures of those esters listed under section 1.7 are of particular interest. Mixtures comprising one such ester which has a melting point below the boiling range of water and another ester from the same group, which ester has, however, a melting point above the boiling range of water, are preferred.

The above-mentioned mixtures additionally containing a phosphite stabiliser are particularly preferred. Examples of such stabilisers are listed under section 4.

It is most particularly preferred to employ a combination of the following three compounds:
  -pentaerythrityl tetrakis[3-(3,5-di-tert-butyl-4-hydroxyphenyl)propionate]
  -octadecyl 3-(3,5-di-tert-butyl-4-hydroxyphenyl)propionate
  -tris(2,4-di-tert-butylphenyl)phosphite.

These compounds may be present either in the same emulsion or dispersion or, preferably, in different emulsions (dispersions) which are applied simultaneously or, preferably, in succession.

Stabilisers or mixtures of stabilisers which have a melting point below the boiling range of water are conveniently emulsified together with the amine of formula I and the polyolefins to be stabilised are treated with the emulsion thus obtained. Stabilisers or mixtures of stabilisers which have a melting point above the boiling range of water are, on the other hand, dispersed and the polyolefins are treated with the resultant dispersion.

Different stabilisers may also be incorporated into different emulsions or dispersions which are then applied simultaneously or in succession to the polyolefin. The use of separate dispersions (or emulsions) is recommended in particular when employing phosphites.

The emulsions or dispersions of the present invention are preferably aqueous systems which may also contain water-miscible organic solvents, e.g. ketones, in particular acetone.

The stabiliser emulsion or dispersion is prepared for example as follows:

The stabilisers to be emulsified or dispersed are processed together wih the amine of formula I and with a customary, preferably non-ionic, emulsifier or mixture of emulsifiers to give a homogeneous melt. (If stabilisers with a melting point above the boiling range of water are employed, then the mixture is subsequently cooled to a temperature below the boiling range of water.) Then at a temperature which must be held below the boiling range of water and with vigorous stirring by means of a high-speed agitator, first a portion, preferably e.g. ⅓ to ½, of the total amount of water is added. Subsequently, with slower stirring, the remainder of the water is added. If desired, a minor amount of an organic solvent such as acetone is also added.

The stabilisers to be dispersed can for example also be charged to the reaction vessel in the form of a fine powder together with the amine and the emulsifier. A portion, e.g. ⅓ to ½, of the total amount of water is subsequently added, with vigorous stirring. (If desired, this mixture can be ground in order to reduce the particle size of the solid even further). With normal stirring, the remainder of the water is then added.

The content of substance (i.e. stabiliser+amine) to be emulsified (or dispersed) is for example 3 to 50% by weight, preferably 5 to 25% by weight, based on the entire emulsion or dispersion.

The emulsifier or the mixture of emulsifiers is employed for example in an amount of 5 to 50% by weight, preferably 10 to 35% by weight, based on the substance (i.e. stabiliser+amine) to be emulsified (or dispersed).

Suitable emulsifiers (or dispersants) are all customary emulsifiers such as those described in Ullmanns Encyclopädie der technischen Chemie (Ullmann's Encyclopaedia of Industrial Chemistry), 3rd edition (1955), Volume 6, pp. 504–505. Non-ionic emulsifiers, e.g. nonylphenoxypoly(oxyethylene)ethanol, polyoxyethylene (20) sorbitan monooleate or sorbitan monooleate, are preferred.

All spherically polymerised polyolefins, e.g. polyethylene, polypropylene, ethylene/propylene copolymers, which are obtained by polymerization with third generation catalysts (such as those described in the above-cited publication by P. Galli, P. C. Barbé and L. Noristi) can be stabilised advantageously by the process of the present invention. Preferred polyolefins are polypropylene and copolymers of propylene.

The invention is illustrated by the following non-limitative Examples.

EXAMPLES 1 TO 4

(a) Preparation of the emulsions (dispersions)

(1) 2 g of pentaerythrityl tetrakis[3-(3,5-di-tert-butyl-4-hydroxyphenyl)propionate] and 2 g of the technical fatty alkyl diethanolamine available under the name of Atmer 163 ® (manufactured by ATLAS) are melted at 160° C. together with 1.35 g of a mixture of emulsifiers, which mixture comprises 20% of sorbitan monooleate and 80% of polyoxyethylene (20) sorbitan monooleate. After the melt has cooled to 97° C., 20 ml of water are added, with vigorous stirring. A solution of 5 ml of acetone is then added, and stirring is continued at normal speed (dispersion 1).

(2) 2 g of pentaerythrityl tetrakis[3-(3,5-di-tert-butyl-4-hydroxyphenyl)propionate] and 2 g of the technical fatty alkyl diethanolamine available under the name of Armostat A 400 ® (manufactured by AKZO) are heated to 130° C. together with 1.10 g of a mixture of emulsifiers, which mixture comprises 20% of sorbitan monooleate and 80% of polyoxyethylene (20) sorbitan monooleate. During heating, the solid substance goes into solution. After said solution has cooled to 95° C., 10 ml of water are added, with vigorous stirring. A solution of 2 ml of acetone in 10 ml of water is then added, and stirring is continued at normal speed (dispersion 2).

(3) 4 g of pentaerythrityl tetrakis[3-(3,5-di-tert-butyl-4-hydroxyphenyl)propionate] and 4 g of triethanolamine are heated to 85° C. in a beaker together with 2 g of a mixture of emulsifiers, which mixture comprises 20% of sorbitan monooleate and 80% of polyoxyethylene (20) sorbitan monooleate, and the batch is then cooled to 50° C. With vigorous stirring, 20 ml of water and 9 ml of acetone are then added. Subsequently, with slower stirring, a further 20 ml of water are added (dispersion 3).

(4) 5 g of octadecyl 3-(3,5-di-tert-butyl-4-hydroxyphenyl)propionate and 5 g of the technical fatty alkyl diethanolamine available under the name of Armostat A 400 ® (manufactured by AKZO) are heated to 70° C. together with 1.7 g of a mixture of emulsifiers, which mixture comprises 20% of sorbitan monooleate and 80% of polyoxyethylene (20) sorbitan monooleate. With vigorous stirring by means of a high-speed agitator, 40 ml of water are added, during which addition the temperature is held at 50° C. Subsequently, with slower stirring, a further 40 ml of water as well as 9 ml of acetone are added (emulsion 4).

(b) Oven ageing test

A 5 liter vessel with pressure-equalising means is charged with 1 000 g of spherical polypropylene (Spheripol ®, manufactured by HIMONT, MFI 9-10), and the respective dispersion or emulsion listed in Table 1 below is then added. The mixture is treated by being shaken for 45 minutes by means of an eccentric tumbling mixer. The spherical polypropylene is then aged in the oven at 120°, 135° and 149° C. The criterion of stabilisation is the oven ageing time in hours until decomposition of the beads under a mechanical load.

The results are shown in Table 1.

TABLE 1

| Example | Dispersion/Emulsion | Oven ageing time in hours at 120° C. | 135° C. | 149° C. |
| --- | --- | --- | --- | --- |
| 1 | 1 | 2952 | 1848 | 528 |
| 2 | 2 | 2952 | 1440 | 480 |
| 3 | 3 | 1152 | 912 | 216 |
| 4 | 4 | > 900 | 864 | 120 |
| untreated spherical polypropylene | | 12 | 5 | 2 |

EXAMPLE 5

(a) Preparation of the dispersions

Dispersion A 50 g of tris(2,4-di-tert-butylphenyl)phosphite and 100 g of the technical fatty alkyl diethanolamine available under the name of Armostat A 400 ® (manufactured by AKZO) are heated together with 33 g of a mixture of emulsifiers, which mixture comprises 20% of sorbitan monooleate and 80% of polyoxyethylene (20) sorbitan monooleate. At 160° C., a clear pale yellow solution is obtained which is then cooled to 98° C. With vigorous stirring, 700 ml of water are added. Stirring is then continued for about 15 minutes. Subsequently, 120 ml of water are added, and stirring is continued for a further 15 minutes. The dispersion may separate after prolonged storage but is completely homogenised again by stirring.

Emulsion B 40 g of pentaerythrityl tetrakis[3-(3,5-di-tert-butyl-4-hydroxyphenyl)propionate], 40 g of octadecyl 3-(3,5-di-tert-butyl-4-hydroxyphenyl)propionate and 10 g of nonylphenoxypoly(oxyethylene)ethanol are melted at 110° C. The melt is allowed to cool to 90° C., and then 60 ml of water are added, with vigorous stirring. During the addition, the temperature drops to 70° C. The white emulsion is poured at once into 250 ml of cold water, and stirring is continued slowly for about 15 minutes.

(b) Oven ageing test

In a 5 liter vessel with pressure-equalising means, 1 000 g of spherical polypropylene are first treated with 10 ml of dispersion A by being shaken for 20 minutes by means of an eccentric tumbling mixer. 10 ml of emulsion B are then added, and the batch is shaken for a further 20 minutes. Subsequently, the oven ageing test as described in Examples 1 to 4 is carried out. The results are shown in Table 2 below.

TABLE 2

| Example | Dispersion | Oven ageing time in hours at 120° C. | 135° C. | 149° C. |
| --- | --- | --- | --- | --- |
| 5 | A + B | > 1800 | 1728 | 576 |
| untreated spherical polypropylene | | 12 | 5 | 2 |

EXAMPLE 6

(a) Preparation of the dispersions

Dispersion C 10 g of pentaerythrityl tetrakis[3-(3,5-di-tert-butyl-4-hydroxyphenyl)propionate] and 10 g of octadecyl 3-(3,5-di-tert-butyl-4-hydroxyphenyl)propionate are melted at 120° C. together with 1.25 g of nonylphenoxypoly(oxyethylene)ethanol. After the melt has cooled to 75° C., first 30 ml of water are added, followed by the addition of a further 49.3 ml of water, with vigorous stirring.

Dispersion D 5 g of tris(2,4-di-tert-butylphenyl)phosphite in powdered form and 2.5 g of the technical fatty alkyl diethanolamine commercially available under the name of Armastat A 400 ® (manufactured by AKZO) are stirred at room temperature together with 1 g of nonylphenoxypoly(oxyethylene)ethanol. Subsequently, 91.5 g of water are added in 3 stages.

(b) Oven ageing test 1 000 g of spherical polypropylene are placed in a 5 liter glass flask. 20 ml of dispersion D are then poured over the polypropylene beads. The glass flask is fixed on a mixer which is run for 5 minutes. 5 ml of dispersion C are then diluted with 10 ml of water and poured over the polypropylene beads. The mixer is run for a further 20 minutes. The polypropylene beads are then placed in a glass dish and aged at 149° C. in an oven with recirculating air. The criterion of stabilisation is the oven ageing time in hours until decomposition of the beads under the pressure of a finger nail.

The results are shown in Table 3.

TABLE 3

| Example | Dispersion | Oven ageing time in hours at 149° C. |
|---------|-----------|--------------------------------------|
| 6 | C + D | 744 |
| untreated spherical polypropylene | | 2 |

What is claimed is:

1. A process for the stabilisation of a spherically polymerised polyolefin which comprises treating said polyolefin with at least one emulsion or dispersion containing a stabiliser or a mixture of stabilisers and 0.05 to 1.0% by weight, based on the polyolefin, of an amine of formula I

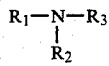    (I)

wherein $R_1$ is $C_1$-$C_{20}$alkyl or $C_1$-$C_{20}$alkyl which is substituted by —OH, or is $C_3$-$C_{50}$alkyl which is interrupted by one or more oxygen atoms, or is $C_1$-$C_8$alkoxy, and each of $R_2$ and $R_3$ independently of the other is hydrogen or has one of the meanings indicated for $R_1$, or $R_2$ and $R_3$, together with the nitrogen atom to which they are attached, form a 5- to 7-membered heterocyclic ring.

2. A process according to claim 1, wherein the amine of formula I is a liquid amine.

3. A process according to claim 1, wherein the amine is a liquid amine of formula I wherein at least one of the radicals $R_2$ and $R_3$ has one of the meanings indicated for $R_1$ in claim 1.

4. A process according to claim 1, wherein the amine is a liquid amine of formula I wherein $R_1$ is straight chain $C_{12}$-$C_{18}$alkyl and at least one of $R_2$ and $R_3$ is a group

wherein n is an integer from 1 to 10.

5. A process according to claim 1, wherein the amine is a liquid amine of formula I wherein $R_1$, $R_2$ and $R_3$ are $C_2$-$C_4$alkyl which is substituted terminally by —OH.

6. A process according to claim 1, wherein the emulsion or dispersion contains the stabilizer or the mixture of stabilisers in an amount of 0.03 to 5.0% by weight, based on the polyolefin.

7. A process according to claim 1, wherein esters of β-(3,5-di-tert-butyl-4-hydroxyphenyl)propionic acid are employed as stabilisers.

8. A process according to claim 7, wherein a phosphite is additionally employed as stabiliser.

9. A process according to claim 1, wherein
   pentaerythrityl tetrakis[3-(3,5-di-tert-butyl-4-hydroxyphenyl)propionate]
   octadecyl 3-(3,5-di-tert-butyl-4-hydroxyphenyl)propionate
   tris(2,4-di-tert-butylphenyl)phosphite
are employed together as stabilisers.

10. A polyolefin which has been stabilised according to claim 1.

* * * * *